(12) United States Patent
Foote et al.

(10) Patent No.: US 11,249,546 B2
(45) Date of Patent: Feb. 15, 2022

(54) NIGHT VISION COMPATIBLE SHORT-WAVE INFRARED EYE TRACKING SYSTEM

(71) Applicant: Rockwell Collins, Inc., Cedar Rapids, IA (US)

(72) Inventors: Bobby D Foote, Marion, IA (US); José-Rodrigo Castillo-Garza, West Hartford, CT (US)

(73) Assignee: Rockwell Collins, Inc., Cedar Rapids, IA (US)

(*) Notice: Subject to any disclaimer, the term of this patent is extended or adjusted under 35 U.S.C. 154(b) by 252 days.

(21) Appl. No.: 16/660,380

(22) Filed: Oct. 22, 2019

(65) Prior Publication Data

US 2021/0357025 A1 Nov. 18, 2021

(51) Int. Cl.
| | | |
|---|---|---|
| *G06F 3/01* | (2006.01) | |
| *G01S 17/66* | (2006.01) | |
| *G02B 27/00* | (2006.01) | |
| *G02B 27/01* | (2006.01) | |

(52) U.S. Cl.
CPC ............ *G06F 3/013* (2013.01); *G01S 17/66* (2013.01); *G02B 27/0093* (2013.01); *G02B 27/0172* (2013.01); *G02B 2027/014* (2013.01); *G02B 2027/0138* (2013.01)

(58) Field of Classification Search
CPC ..... G01B 11/2513; G01S 17/46; G01S 17/86; G01S 17/89; G01S 3/00; G01S 7/499; H04N 13/254; H04N 13/337; H04N 5/33
See application file for complete search history.

(56) References Cited

U.S. PATENT DOCUMENTS

| | | | |
|---|---|---|---|
| 7,000,469 B2 | 2/2006 | Foxlin et al. | |
| 10,176,375 B2 | 1/2019 | Wagner et al. | |
| 10,977,815 B1* | 4/2021 | Chao | G02F 1/125 |
| 2017/0026560 A1 | 1/2017 | Whitehouse et al. | |
| 2017/0307880 A1 | 10/2017 | Shrubsole et al. | |
| 2018/0217665 A1 | 8/2018 | Konstantatos et al. | |
| 2018/0227567 A1* | 8/2018 | Chao | H04N 13/254 |
| 2019/0056599 A1 | 2/2019 | Reshidko et al. | |
| 2020/0393680 A1* | 12/2020 | Hogstedt | G01J 5/0853 |

FOREIGN PATENT DOCUMENTS

| | | |
|---|---|---|
| EP | 0883195 A1 | 12/1998 |
| EP | 3514606 A1 | 7/2019 |

OTHER PUBLICATIONS

Extended Search Report for European Application No. 20203443.5 dated Mar. 21, 2021, 8 pages.

* cited by examiner

*Primary Examiner* — Nelson M Rosario
(74) *Attorney, Agent, or Firm* — Suiter Swantz pc llo

(57) ABSTRACT

A system and method. The system may include an eye tracking system. The eye tracking system may include a short-wave infrared (SWIR) light source configured to emit SWIR light at between 900 nanometers (nm) and 1,700 nm wavelength onto an environment, a SWIR sensitive image sensor configured to capture images of the environment illuminated by the SWIR light source, and a processor communicatively coupled to the SWIR sensitive image sensor. The processor may be configured to: receive image data from the SWIR sensitive image sensor; track movement of an eye of a user based on the image data; and output eye tracking system data indicative of the tracked movement of the eye of the user.

14 Claims, 10 Drawing Sheets

US 11,249,546 B2

NIGHT VISION COMPATIBLE SHORT-WAVE INFRARED EYE TRACKING SYSTEM

BACKGROUND

Optical based trackers such as eye and helmet trackers usually include the use of an infra-red illuminator that is in the 800 to 900 nanometers (nm) range. While the light at this range is invisible to the human eye, night vision sensors and analog goggles have high sensitivity in this range. This incompatibility creates a complexity that designers will find difficult to overcome.

Currently, the sensitivity of most night vision imaging systems, which include digital and analog systems, overlap with illuminators used in eye and helmet trackers. Any light in the sensitivity range of the night vision system can cause blooming and saturation in the night vision images, which can make the night vision system unusable for a user.

Additionally, timing issues between digital night vision sampling and tracker illumination can require trades that degrade both systems. Digital night vision systems currently, typically operate at 60 Hertz (Hz) and 120 Hz with dwell times of 16 milliseconds (ms) and 8 ms, respectively. Dwell times for optical trackers can be as long as 4 ms, which can cause a significant overlap between the two.

Further, current eye tracking systems work in the near infra-red range, typically at between 830 to 870 nm. Eye exposure to light at 830 to 870 nm for extended periods of time can be unsafe under some circumstances.

SUMMARY

In one aspect, embodiments of the inventive concepts disclosed herein are directed to a system. The system may include an eye tracking system. The eye tracking system may include a short-wave infrared (SWIR) light source configured to emit SWIR light at between 900 nanometers (nm) and 1,700 nm wavelength onto an environment, a SWIR sensitive image sensor configured to capture images of the environment illuminated by the SWIR light source, and a processor communicatively coupled to the SWIR sensitive image sensor. The processor may be configured to: receive image data from the SWIR sensitive image sensor; track movement of an eye of a user based on the image data; and output eye tracking system data indicative of the tracked movement of the eye of the user.

In a further aspect, embodiments of the inventive concepts disclosed herein are directed to a method. The method may include emitting short-wave infrared (SWIR) light at between 900 nanometers (nm) and 1,700 nm wavelength onto an environment. The method may further include capturing, by a SWIR sensitive image sensor, images of the environment illuminated by the SWIR light. The method may further include receiving image data from the SWIR sensitive image sensor. The method may further include tracking movement of an eye of a user based on the image data. The method may further include outputting eye tracking system data indicative of the tracked movement of the eye of the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
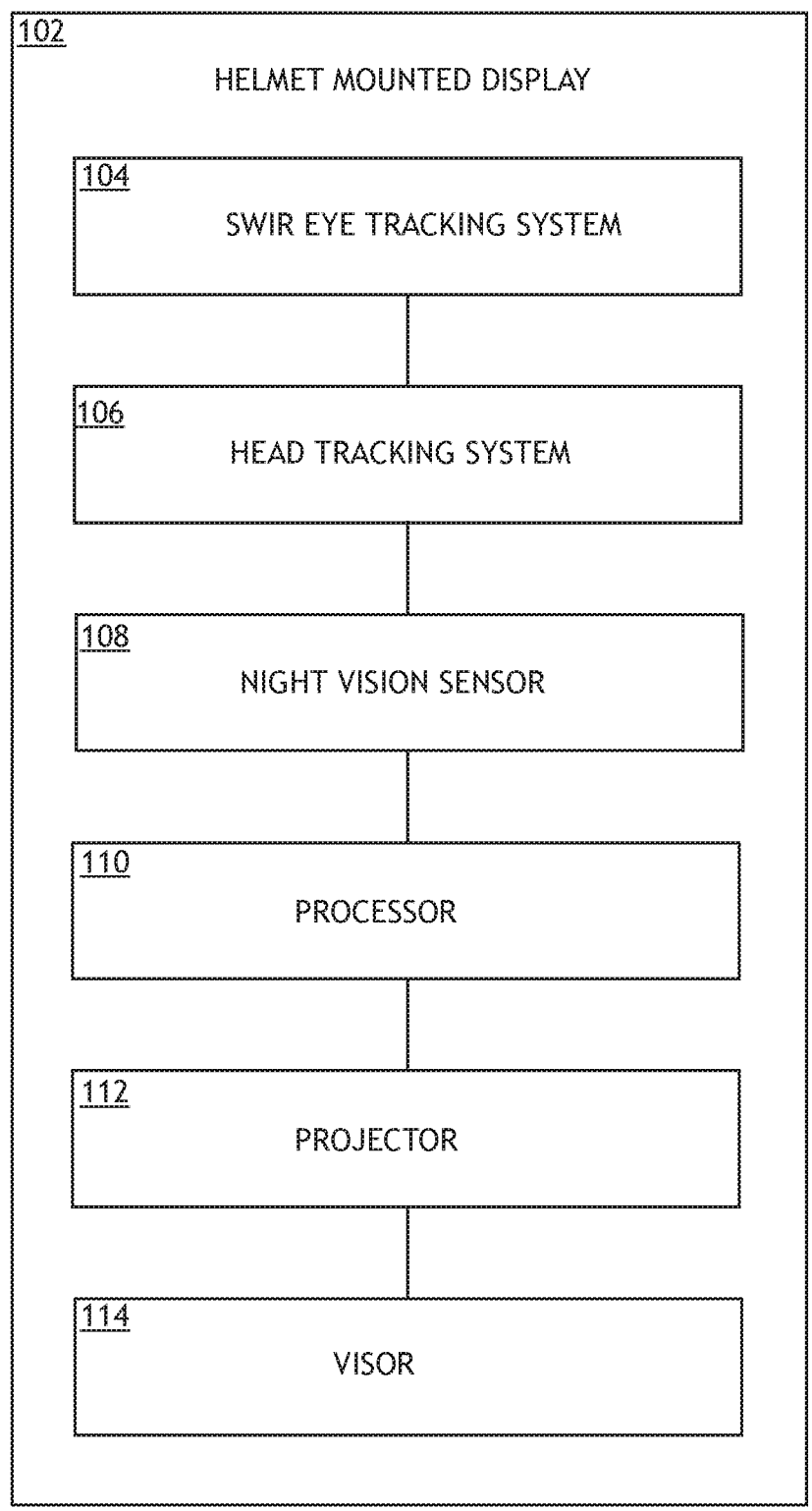
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a short-wave infrared (SWIR) eye tracking system. The SWIR eye tracking system may include a SWIR light source, a SWIR sensitive image sensor, and a processor configured to receive image data from the SWIR sensitive image sensor, track movement of an eye(s) of a user based on the image data, and output eye tracking system data. In some embodiments, the SWIR eye tracking system may be compatible with a night vision imaging system. Some embodiments may provide a low-cost solution over currently implemented eye tracking systems, which typically operate in the near-infrared spectrum, causing interference with night vision imaging systems, which may have sensitivity in the near-infrared spectrum. For example, the SWIR sensitive image sensor may be implemented as a low-cost commercial SWIR sensitive complementary metal oxide semiconductor (CMOS) image sensor or a SWIR sensitive charge coupled device (CCD) image sensor that has useable sensitivity above 900 nm (e.g., between 900 nm and 1,700 nm, between 980 nm and 1,200 nm, and/or above 1000 nm). For example, the SWIR sensitive image sensor may be implemented as a SWIR sensitive camera that has useable sensitivity above 900 nm (e.g., between 900 nm and 1,800 nm, between 980 nm and 1,200 nm, and/or above 1000 nm). For example, the SWIR light source may emit light above 900 nm (e.g., between 900 nm and 1,700 nm, between 980 nm and 1,200 nm, and/or above 1000 nm). The SWIR light source and/or the SWIR sensitive image sensor may have update rates at or above 300 Hz. In some embodiments, because night vision imaging systems typically have sensitivity near zero above 900 nm, the SWIR eye tracking system may may not interfere with the night vision imaging system. Some embodiments may have the benefit of providing an illuminated crew station outside of night vision sensitivity range; and this may provide a means to reduce visible lighting during night missions that would also be invisible to typical, current night vision systems.

In some embodiments, the SWIR eye tracking system may be included within a helmet-mounted display (HMD) system and/or may be implemented in proximity to eye(s) of a user (e.g., in a cockpit of an aircraft).

In some embodiments, the operation of the SWIR eye tracking system in the SWIR spectrum may be safer for a user's eyes as compared to an eye tracking system operating in the near-infrared spectrum. In some embodiments, use of a SWIR light source above 900 nm may increase eye safety and increases night vision goggle compatibility.

In some embodiments, the SWIR eye tracking system may be used for health monitoring, work load assessment, targeting, and other uses in various environments (e.g., fixed wing HMD environments and/or rotary wing HMD environments). For example, the SWIR eye tracking system may be used for aircraft (e.g. fighter jet (e.g., F-35)) HMD applications, next generation HMD applications, rotary wing HMD applications, fast boat applications, and/or ground applications.

Referring now to FIGS. 1-5, an exemplary embodiment of a system 100 according to the inventive concepts disclosed herein is depicted. The system 100 may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 1, the system 100 may include at least one HMD system 102; while some embodiments may include the HMD system 102, other embodiments may include one or more elements of the HMD system 102 implemented without the HMD system 102. In some embodiments, the HMD system 102 may include at least one SWIR eye tracking system 104, at least one head tracking system 106, at least one night vision sensor 108, at least one processor 110, at least one projector 112, and at least one visor 114, some or all of which may be communicatively coupled at any given time.

Figure 2:
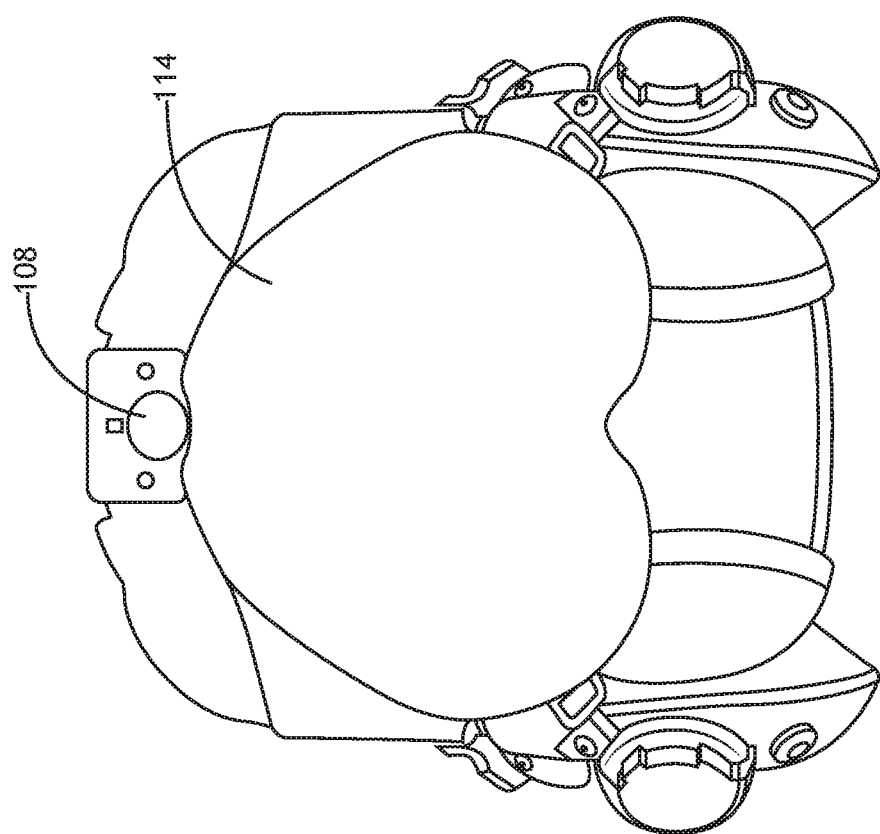
FIG. 2 is a view of the helmet-mounted display (HMD) system of FIG. 1 according to the inventive concepts disclosed herein.

The HMD system 102 may be implemented as any suitable HMD system in any suitable environment. For example, as shown in FIG. 2, the HMD system 102 may be implemented as a lightweight, wide field of view (FOV), off-the-visor HMD with an integrated night vision system that may provide a user with unparalleled and intuitive access to flight, navigation, tactical, and/or sensor information that may, for example, be displayed on the visor 114.

Figure 3:
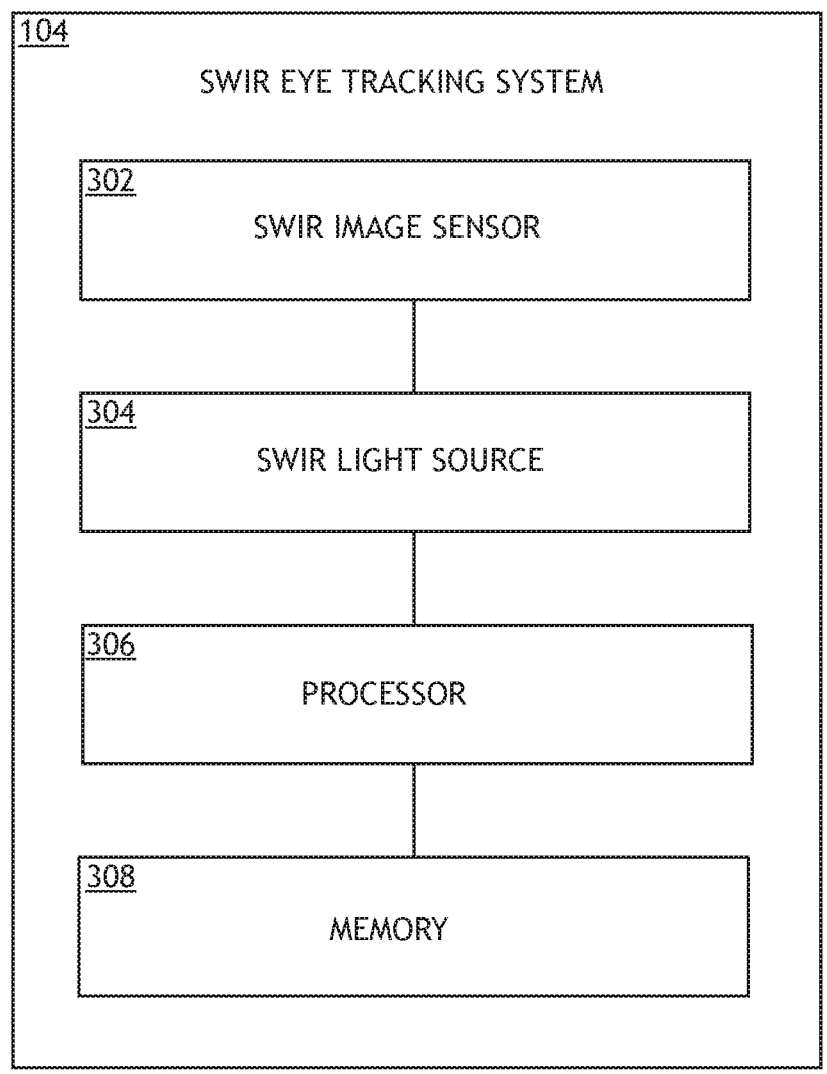
FIG. 3 is a view of the SWIR eye tracking system of FIGS. 1-2 according to the inventive concepts disclosed herein.

The eye tracking system 104 may include at least one SWIR light source 302 (e.g., at least one SWIR light emitting diode (LED)), at least one SWIR sensitive image sensor 304, at least one processor 306, and at least one memory 308, as well as other components, equipment, and/or devices commonly included in an eye tracking system, some or all of which may be communicatively coupled at any time, as shown in FIG. 3. The eye tracking system 104 may be configured to track eye gestures, track movement of a user's eye, track a user's gaze, and/or otherwise receive inputs from a user's eyes. The eye tracking system 104 may be configured for performing fully automatic eye tracking operations of users in real time.

Figure 4A:
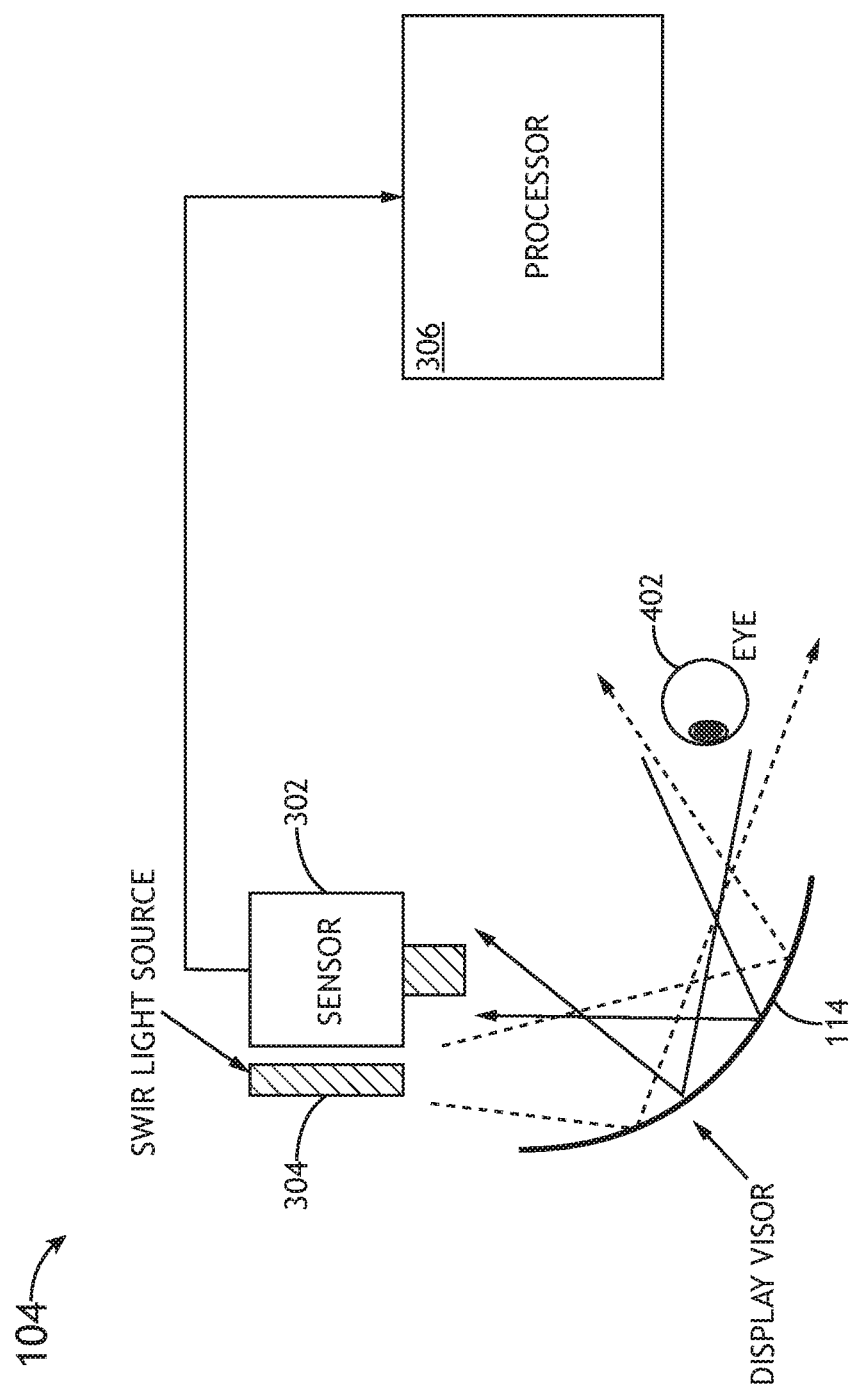
FIG. 4A is a view of one embodiment the HMD system of FIGS. 1-2 according to the inventive concepts disclosed herein.
Figure 4B:
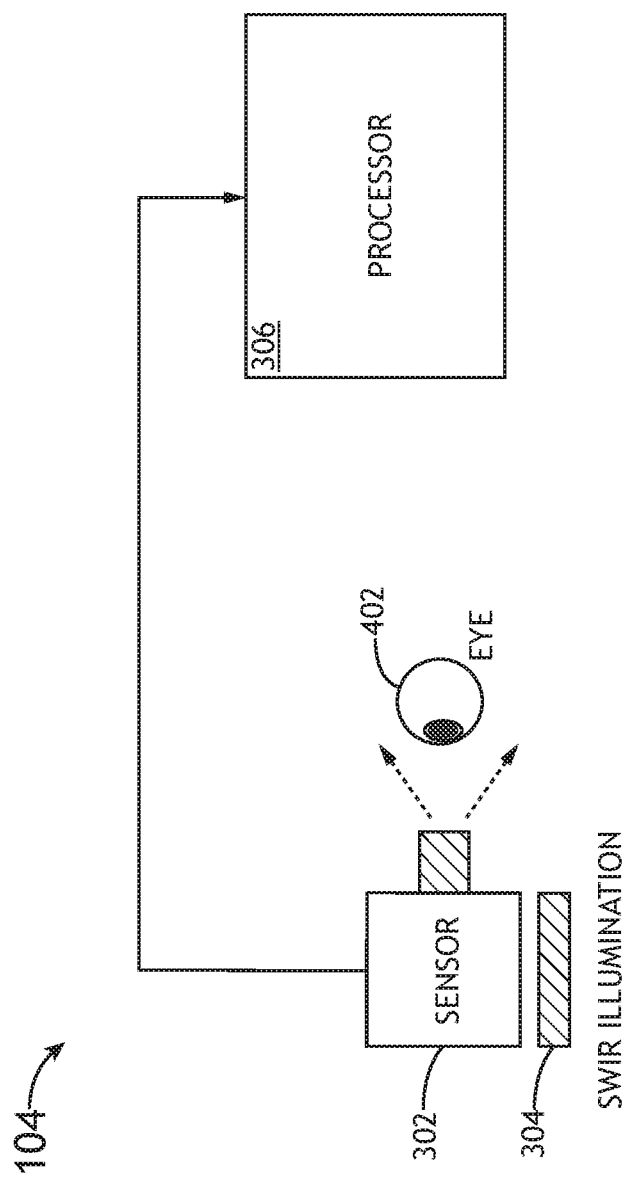
FIG. 4B is a view of one embodiment the HMD system of FIGS. 1-2 according to the inventive concepts disclosed herein.

The SWIR light source 302 may be configured to emit SWIR light at between 900 nm and 1,700 nm wavelength (e.g., above 1,000 nm and/or between 980 nm and 1,200 nm) onto an environment, such as directly (e.g., as shown in FIG. 4A) or indirectly (e.g., reflected off an object (e.g., the visor 114), as shown in FIG. 4B) onto at least one eye 402 of a user.

The SWIR sensitive image sensor 304 may be configured to capture images of the environment illuminated by the SWIR light source 302. In some embodiments, the SWIR sensitive image sensor 304 may be a SWIR sensitive complementary metal oxide semiconductor (CMOS) image sensor or a SWIR sensitive charge coupled device (CCD) image sensor. In some embodiments, the SWIR sensitive image sensor 304 may be implemented as a SWIR sensitive camera that has useable sensitivity above 900 nm (e.g., between 900 nm and 1,800 nm, between 980 nm and 1,200 nm, and/or above 1000 nm). In some embodiments, the SWIR sensitive image sensor 304 may have an update rate at or above 300 Hz.

The processor 306 may be configured to process data received from the SWIR sensitive image sensor 304 and output processed data to one or more devices or systems of the HMD system 102 and/or the system 100. For example, the processor 306 may be configured to generate eye tracking data and output the generated eye tracking data to one of the devices (e.g., the processor 110) of the HMD system 102 and/or the system 100. The processor 306 may be configured to run various software applications or computer code stored (e.g., maintained) in a non-transitory computer-readable medium (e.g., memory 308) and configured to execute various instructions or operations. The processor 306 may be implemented as a special purpose processor configured to execute instructions for performing (e.g., collectively performing if more than one processor) any or all of the operations disclosed throughout. For example, the processor 306 may be configured to: receive image data from the SWIR sensitive image sensor 304; track movement of at least one eye of a user based on the image data; and/or output eye tracking system data indicative of the tracked movement of the at least one eye of the user. For example, the processor 306 may be configured to: perform visor distortion correction operations; perform eye mapping and alignment operations; output, via at least one data connection, eye tracking system data (e.g., indicative of eye azimuth and/or elevation) to an aircraft interface, simulator interface, and/or other computing device of the system 100; and/or perform a head tracking translation operation.

Figure 5:
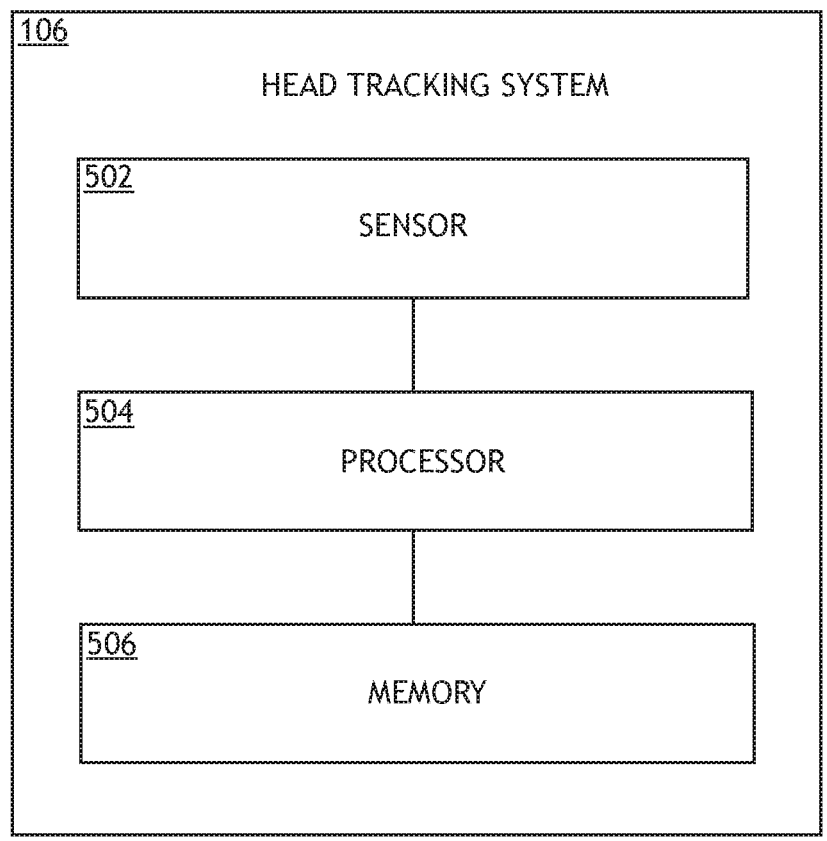
FIG. 5 is a view of the head tracking system of FIGS. 1-2 according to the inventive concepts disclosed herein.

The head tracking system 106 may have optical, magnetic, and/or inertial tracking capability. The head tracking system 106 may include at least one sensor 502, at least one processor 504, and at least one memory 506, as well as other components, equipment, and/or devices commonly included in a head tracking system, some or all of which may be communicatively coupled at any time, as shown in FIG. 5. The at least one sensor may be at least one optical sensor (e.g., an optical infrared sensor configured to detect infrared light having a wavelength of less than 900 nm), at least one magnetic sensor, and/or at least one inertial sensor. The head tracking system 106 may be configured to determine and track a position and an orientation of a user's head relative to an environment. The head tracking system 106 may be configured for performing fully automatic head tracking operations in real time. The processor 504 of the head tracking system 106 may be configured to process data received from the sensors 502 and output processed data to one of the computing devices of the system and/or the processor 110 for use in generating images aligned with the user's field of view, such as augmented reality or virtual reality images aligned with the user's field of view to be displayed by the projector 112 onto the visor 114. For example, the processor 504 may be configured to determine and track a position and orientation of a user's head relative to an environment. Additionally, for example, the processor 504 may be configured to generate position and orientation data associated with such determined information and output the generated position and orientation data. The processor 504 may be configured to run various software applications or computer code stored in a non-transitory computer-readable medium (e.g., memory 506) and configured to execute various instructions or operations. The at least one processor 504 may be implemented as a special purpose processor configured to execute instructions for performing (e.g., collectively performing if more than one processor) any or all of the operations disclosed throughout.

The night vision image sensor 108 (e.g., a night vision camera) may be configured to capture night vision images of the environment. In some embodiments, the night vision image sensor 108 may be configured to detect infrared light having a wavelength of less than 900 nm, wherein the SWIR light from the SWIR light source 302 does not interfere with the night vision image sensor 108. In some embodiments, the night vision image sensor 108 may be configured to output night vision image data to the processor 110, which may output the images to the projector 112 to be displayed onto the visor 114.

The at least one processor 110 may be implemented as a general purpose or special purpose processor configured to execute instructions for performing (e.g., collectively performing if more than one processor) any or all of the operations disclosed throughout. For example, the processor 110 may be configured to: receive the eye tracking system data; receive the head tracking system data; receive the night vision image data; generate and/or output synthetic vision system image data to the projector 112, for example, based on the eye tracking system data and/or the head tracking system data; generate and/or output night vision image data to the projector 112, for example, based on the eye tracking system data and/or the head tracking system data; generate and/or output augmented reality and/or virtual reality image data to the projector, for example, based on the eye tracking system data and/or the head tracking system data; and/or generate and/or output other image data, which may include vehicle operation (e.g., flight) information, navigation information, tactical information, and/or sensor information to the projector 112, for example, based on the eye tracking system data and/or the head tracking system data.

The projector 112 may be configured to receive image data from the processor 110 and project images onto the visor 114 for display to the user.

Figure 6:
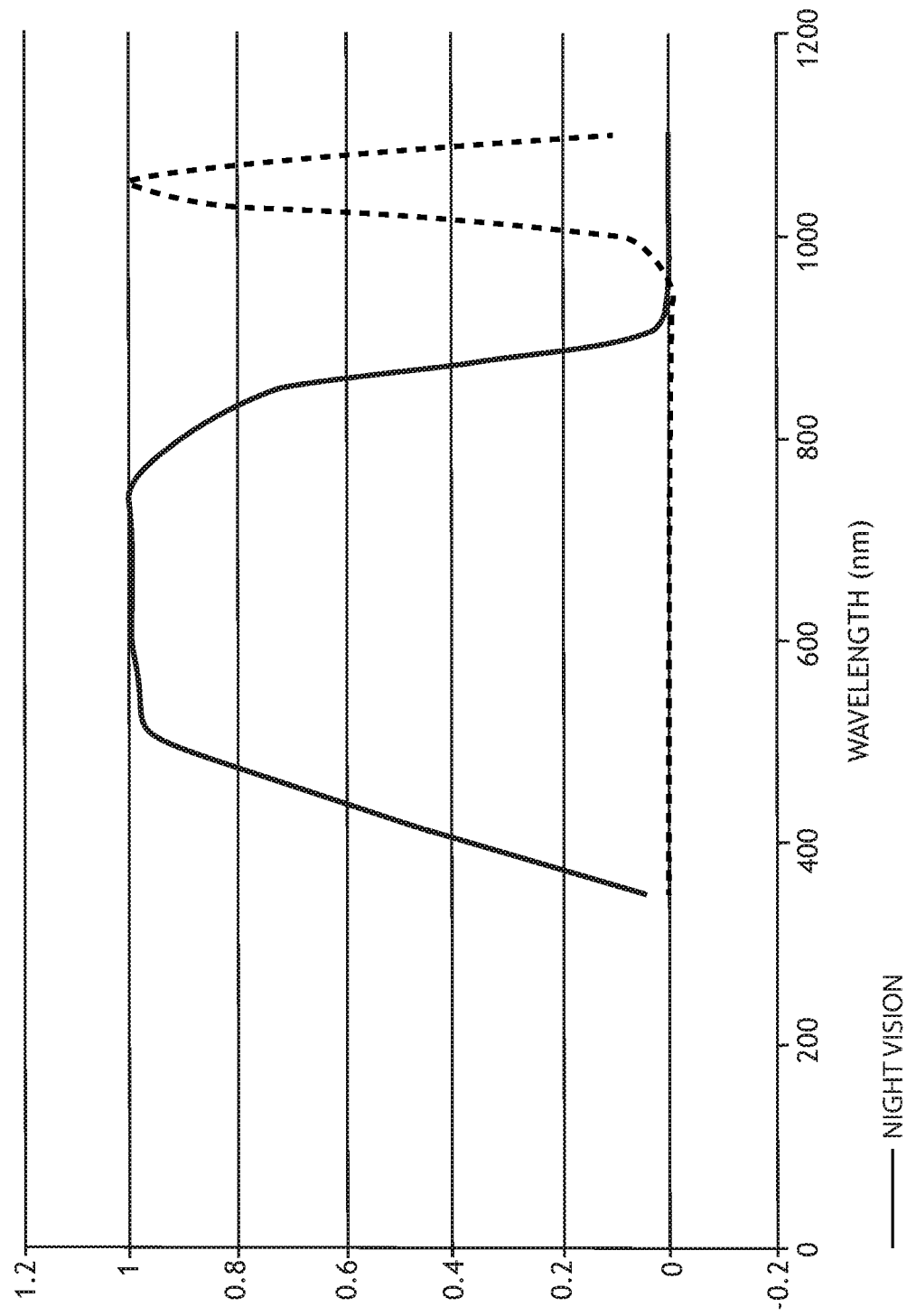
FIG. 6 is an exemplary graph of night vision sensitivity and SWIR eye tracking system sensitivity versus wavelength according to the inventive concepts disclosed herein.

Referring now to FIG. 6, an exemplary graph of night vision sensitivity and SWIR eye tracking system 104 sensitivity versus wavelength of some embodiments according to the inventive concepts disclosed herein shows that the SWIR eye tracking system 104 does not interfere with the night vision sensor 108.

Figure 7:
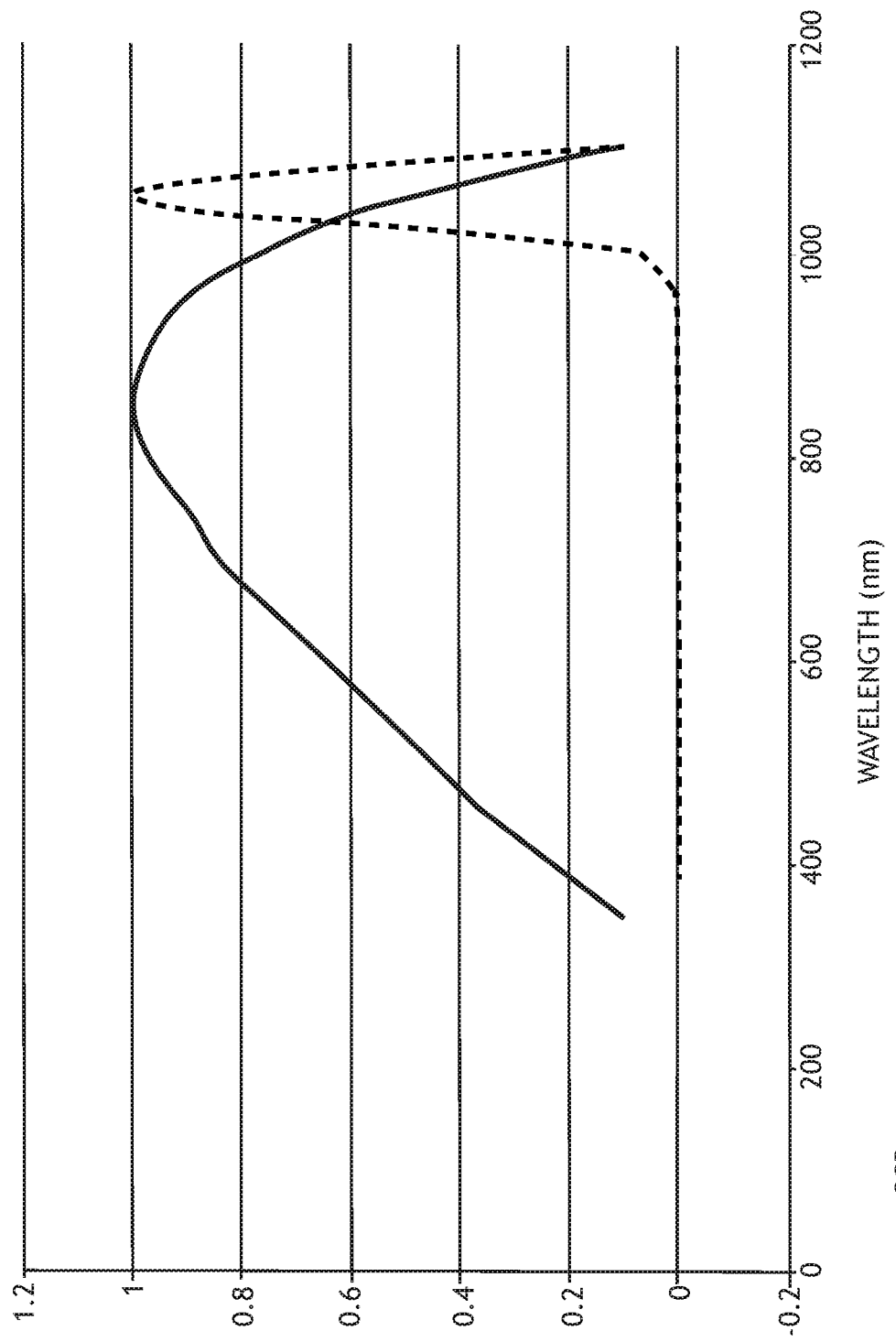
FIG. 7 is an exemplary graph of the SWIR light source and the SWIR sensitive image sensor sensitivity versus wavelength of some embodiments according to the inventive concepts disclosed herein.

Referring now to FIG. 7, an exemplary graph of the SWIR light source 302 spectrum and the SWIR sensitive image sensor 304 (e.g., CCD) sensitivity versus wavelength of some embodiments according to the inventive concepts disclosed herein shows that the SWIR sensitive image sensor 304 is sensitive to light emitted from the SWIR light source 302 above 900 nm (e.g., above 1000 nm and/or between 980 nm and 1,200 nm).

Figure 8:
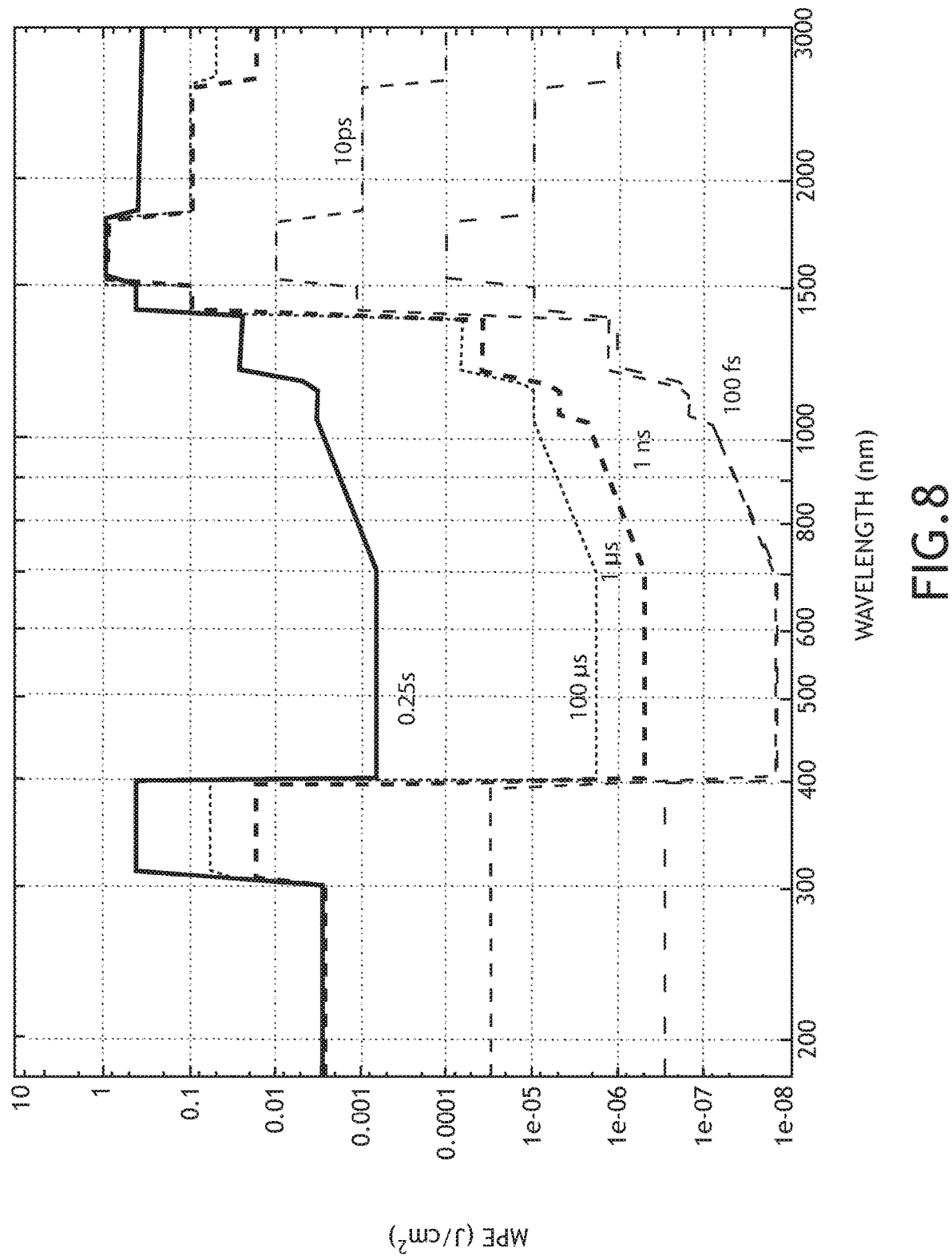
FIG. 8 is an exemplary graph of maximum power exposure according to the inventive concepts disclosed herein.

Referring now to FIG. 8, an exemplary graph of maximum power exposure (MPE, in Joules per centimeters squared) versus wavelength for several pulse durations (e.g., measured in seconds (s), microseconds, nanoseconds (ns), and femtoseconds (fs)) of some embodiments according to the inventive concepts disclosed herein shows that the SWIR spectrum can be safer for longer eye exposure than the near-infrared spectrum.

Figure 9:
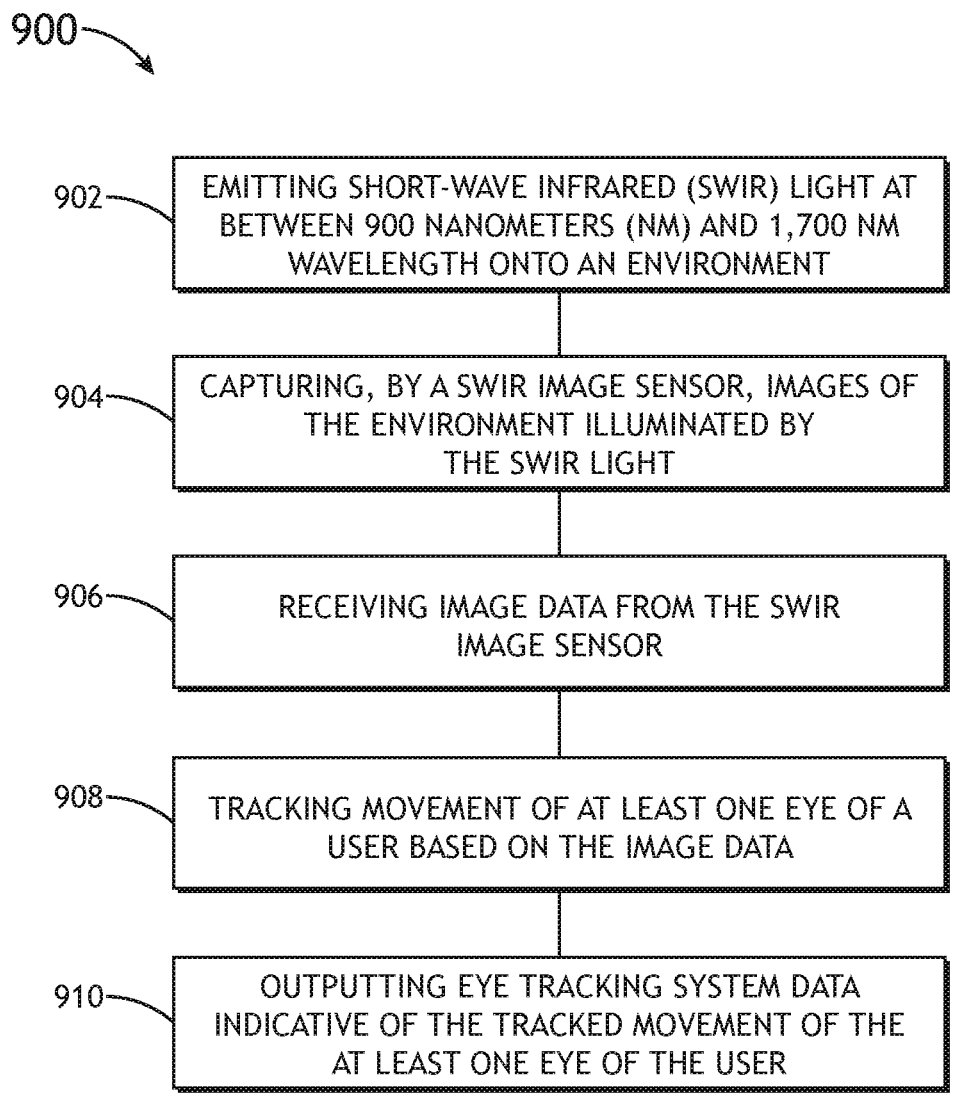
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps. Additionally, for example, some embodiments may include performing one more instances of the method 900 iteratively, concurrently, and/or sequentially. Additionally, for example, at least some of the steps of the method 1900 may be performed in parallel and/or concurrently. Additionally, in some embodiments, at least some of the steps of the method 900 may be performed non-sequentially.

A step 902 may include emitting short-wave infrared (SWIR) light at between 900 nanometers (nm) and 1,700 nm wavelength onto an environment.

A step 904 may include capturing, by a SWIR sensitive image sensor, images of the environment illuminated by the SWIR light.

A step 906 may include receiving image data from the SWIR sensitive image sensor.

A step 908 may include tracking movement of at least one eye of a user based on the image data.

A step 910 may include outputting eye tracking system data indicative of the tracked movement of the at least one eye of the user.

Further, the method 900 may include any of the operations disclosed throughout.

As will be appreciated from the above, embodiments of the inventive concepts disclosed herein may be directed to a method and a system including a SWIR eye tracking system.

As used throughout and as would be appreciated by those skilled in the art, "at least one non-transitory computer-readable medium" may refer to as at least one non-transitory computer-readable medium (e.g., memory 308 and/or memory 506; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   an eye tracking system, comprising:
   a short-wave infrared (SWIR) light source configured to emit SWIR light at between 900 nanometers (nm) and 1,700 nm wavelength onto an environment;
   a SWIR sensitive image sensor configured to capture images of the environment illuminated by the SWIR light source; and
   at least one processor communicatively coupled to the SWIR sensitive image sensor, the at least one processor configured to:
   receive image data from the SWIR sensitive image sensor;
   track movement of at least one eye of a user based on the image data; and
   output eye tracking system data indicative of the tracked movement of the at least one eye of the user; and
   a night vision image sensor configured to capture night vision images of the environment, wherein the night vision image sensor is configured to detect infrared light having a wavelength of less than 900 nm, wherein the SWIR light does not interfere with the night vision image sensor.

2. The system of claim 1, wherein the system is a helmet-mounted display system.

3. The system of claim 1, wherein the SWIR light source is configured to emit SWIR light at between 980 nm and 1,200 nm wavelength.

4. The system of claim 1, wherein the SWIR sensitive image sensor is a SWIR camera.

5. The system of claim 1, wherein the SWIR sensitive image sensor is a SWIR sensitive complementary metal oxide semiconductor (CMOS) image sensor.

6. The system of claim 1, wherein the SWIR sensitive image sensor is a SWIR sensitive charge coupled device (CCD) image sensor.

7. The system of claim 1, wherein the SWIR sensitive image sensor has an update rate at or above 300 Hertz (Hz).

8. The system of claim 1, wherein the SWIR light source is configured to emit the SWIR light directly onto the at least one eye of user.

9. The system of claim 1, wherein the SWIR light source is configured to emit the SWIR light onto an object such that the SWIR light is reflected onto the at least one eye of user.

10. The system of claim 9, wherein the object is a visor.

11. The system of claim 1, further comprising a projector and a visor, wherein the projector is configured to project the night vision images onto the visor.

12. The system of claim 11, further comprising a head tracking system.

13. The system of claim 12, wherein the system is a helmet-mounted display system, wherein the head tracking system comprises an optical infrared sensor configured to detect infrared light having a wavelength of less than 900 nm.

14. A method, comprising:
  emitting, by a short-wave infrared (SWIR) light source of an eye tracking system, SWIR light at between 900 nanometers (nm) and 1,700 nm wavelength onto an environment;
  capturing, by a SWIR sensitive image sensor of the eye tracking system, images of the environment illuminated by the SWIR light;
  receiving, by at least one processor communicatively coupled to the SWIR sensitive image sensor, image data from the SWIR sensitive image sensor, wherein the eye tracking system includes the at least one processor;
  tracking, by at least one processor, movement of at least one eye of a user based on the image data;
  outputting, by at least one processor, eye tracking system data indicative of the tracked movement of the at least one eye of the user; and
  capturing, by a night vision image sensor, night vision images of the environment, wherein the night vision image sensor is configured to detect infrared light having a wavelength of less than 900 nm, wherein the SWIR light does not interfere with the night vision image sensor.

* * * * *